United States Patent
Song et al.

(10) Patent No.: US 7,565,276 B2
(45) Date of Patent: Jul. 21, 2009

(54) METHOD OF SIMULATING DETAILED MOVEMENTS OF FLUIDS USING DERIVATIVE PARTICLES

(75) Inventors: Oh-Young Song, Seoul (KR); Doyub Kim, Seoul (KR); Hyeong-Seok Ko, Seoul (KR)

(73) Assignee: Seoul National University Industry Foundation, Bongchun-dong, Gwanak-Gu, Seoul (KR)

( * ) Notice: Subject to any disclaimer, the term of this patent is extended or adjusted under 35 U.S.C. 154(b) by 298 days.

(21) Appl. No.: 11/398,982

(22) Filed: Apr. 5, 2006

(65) Prior Publication Data

US 2007/0239414 A1    Oct. 11, 2007

(51) Int. Cl.
*G06F 17/50* (2006.01)
*G06T 13/00* (2006.01)
(52) U.S. Cl. ............... 703/2; 703/6; 703/9; 345/474
(58) Field of Classification Search ............ 703/2, 703/6, 9; 345/474; 708/300
See application file for complete search history.

(56) References Cited

U.S. PATENT DOCUMENTS

2005/0182603 A1*  8/2005  Freitas et al. ............. 703/2
2005/0253854 A1*  11/2005  Lischinski et al. ........ 345/474

* cited by examiner

*Primary Examiner*—Thai Phan
(74) *Attorney, Agent, or Firm*—John K. Park; Park Law Firm

(57) ABSTRACT

The method provides a new fluid simulation technique that significantly reduces the non-physical dissipation of velocity using particles and derivative information. In solving the conventional Navier-Stokes equations, the method replace the advection part with a particle simulation. When swapping between the grid-based and particle-based simulators, the physical quantities such as the level set and velocity must be converted. A novel dissipation-suppressing conversion procedure that utilizes the derivative information stored in the particles as well as in the grid points is developed. Through several experiments, the proposed technique can reproduce the detailed movements of high-Reynolds-number fluids, such as droplets/bubbles, thin water sheets, and whirlpools. The increased accuracy in the advection, which forms the basis of the proposed technique, can also be used to produce better results in larger scale fluid simulations.

18 Claims, 10 Drawing Sheets

METHOD OF SIMULATING DETAILED MOVEMENTS OF FLUIDS USING DERIVATIVE PARTICLES

BACKGROUND OF THE INVENTION

The present invention relates to a method of simulating detailed movements of fluids using derivative particles.

1. Introduction

When water interacts violently with solids, air, or water itself, it takes on a variety of structures, including droplets/bubbles, thin water sheets, and whirlpools, as shown in FIG. 7. Such features can appear when fluids undergo motions characterized by high Reynolds numbers, where the Reynolds number represents the relative magnitude of the inertia compared to the viscosity of the fluid. Fast-moving water is a typical high-Reynolds-number fluid. The invention explores the physically-based simulation of such phenomena.

Assuming that the Navier-Stokes equations correctly model the physical movements of fluids, a plausible simulation should be able to reproduce the high-Reynolds-number behaviors of water. Although the present work focuses on water, it can apply to any fluid. To date, however, these phenomena have not been satisfactorily reproduced. The invention identifies the factors underlying this failure, and proposes a method that allows realistic simulation of high-Reynolds-number liquid motions.

Implausible simulation of high-Reynolds-number fluids is related to numerical dissipation. Specifically, discretized simulation of the Navier-Stokes equations inevitably calls for evaluating physical quantities at non-grid points. In most methods, such values are calculated by interpolation of the values of the physical quantities at the grid points. However, the error introduced by this approximation acts like nonphysical viscosity or numerical dissipation. This dissipation can be reduced by using a finer grid; however, increasing the grid resolution may increase the computation time and memory requirements to impractical levels. Over the last few years, several elegant techniques have been proposed to address this issue. Bringing in particles into the Eulerian scheme can help capture the inertial movement of fluids, and increases the effective resolution of the simulation. Enright et al. [2002b] introduced the particle level set method, which increases the accuracy of surface tracking by spreading particles around the interface. Losasso et al. [2004] proposed an octree-based multi-level fluid solver that allows finer-resolution simulations in more interesting regions such as water surfaces.

Unfortunately, the above techniques cannot produce high-Reynolds-number liquids with sufficient detail and realism. The simulated fluid appears more viscous than in real physics; the fluids often look thick/sticky, and the movements of small-scale features that are typically observed in complex flows do not appear. The applicants find that the reason the above dissipation-suppressing techniques produce this sort of artifacts is because they cannot effectively suppress the velocity-dissipation, even though they reduce the mass dissipation remarkably.

In the present invention, the applicants introduce a new concept called derivative particles, and develop a fluid simulator based on that concept. The applicants take advantage of the non-dissipative nature of the Lagrangian scheme for the simulation of the advection part; for fluid regions where details need to be simulated, the applicants solve the advection step using particles. Switching between the grid-based and particle-based simulators can introduce numerical dissipation. The present invention develops a new conversion procedure that allows the reproduction of detailed fluid movements. One innovative aspect of this work is that, in addition to storing the physical quantities (velocity and level set value), the derivative particles also store the spatial derivatives of those quantities, which enables more accurate evaluation of the physical quantities at non-grid/non-particle positions. The use of particles in the present work differs from the particle level set method [Enright et al. 2002b] in that the derivative particles carry fluid velocities as well as level set values.

Experiments show that the proposed simulator tracks interfaces accurately. More interestingly, the proposed method turns out to reduce nonphysical damping to a remarkable extent, allowing the reproduction of the magnificent movements of small scale features that occur in real high-Reynolds-number fluids.

The remainder of the specification is organized as follows: Section 2 reviews previous work; Section 3 gives an overview of the simulator; Section 4 presents the octree-based constrained interpolation profile (CIP) solver; Section 5 presents the derivative particle model; Section 6 reports our experimental results; and Section 7 concludes the specification.

2. Previous Work

Since Foster and Metaxas [1996; 1997] first introduced fluid animation techniques based on full 3D Navier-Stokes simulation, the approach has spread widely among the computer graphics community. Jos Stam [1999] introduced a stable fluid solver known as Stable Fluids. The advection step of this solver was implemented using a semi-Lagrangian method [Staniforth and Côt`e 1991], which remains stable even when large time steps are used. Since then, there have been active developments of fast fluid animation techniques in computer graphics, based on the semi-Lagrangian method. Rasmussen et al. [2003] proposed a technique to produce 3D large scale animations of gases using a 2D semi-Lagrangian solver, and Feldman et al. [2003] proposed an explosion model that incorporates a particle-based combustion model into the Stable Fluids solver. Treuille et al. [2003; 2004] introduced an optimization technique that generates the fluid flows that meet specified keyframe constraints. In addition, Feldman et al. proposed the use of a hybrid grid that combines a staggered grid and an unstructured grid [Feldman et al. 2005a], and also proposed the use of a deformable grid [Feldman et al. 2005b], for which they had to modify the semi-Lagrangian method.

In order to simulate liquids, a model for tracking the liquid surfaces is needed in addition to a stable Navier-Stokes solver. For this purpose, Foster and Fedkiw [2001] proposed a hybrid surface model in which massless particles are introduced to the level set field. This model motivated the development of the particle level set method [Enright et al. 2002b], which can capture the dynamic movements of fluid surfaces with remarkable accuracy. Enright et al. [2005] demonstrated that the particle level set method allows the use of large time steps in the semi-Lagrangian framework. The method has been employed to model the interactions between fluids and rigid bodies [Carlson et al. 2004] and between fluids and deformable thin-shell objects [Guendelman et al. 2005], as well as to animate viscoelastic fluids [Goktekin et al. 2004], sand [Zhu and Bridson 2005], multi-phase fluids [Hong and Kim 2005], and water drops [Wang et al. 2005].

As an alternative to the grid-based approaches, purely particle-based methods have also been studied. Stam and Fiume [1995] used smoothed particle hydrodynamics (SPH) to model gaseous phenomena. In SPH, the fluid is represented by a collection of particles, and the simulator calculates movements of them by accounting for each term of the Navier-Stokes equations. Muller et al. [2003] used the SPH model for simulating liquids, and in [Muller et al. 2005], they use the technique for simulating multi-phase fluid interactions. Premoˆze et al. [2003] introduced the moving particle semi-implicit (MPS) method to the graphics community, a technique that shows better performance than SPH in simulating the incompressible movements of fluids. However, a fundamental drawback of purely particle-based methods is their lack of a surface tracking capability; if an inappropriate number of particles are used, they can produce grainy or overly smoothed surfaces.

A primary factor that impairs the visual realism (and also the physical accuracy) of simulated results is the numerical dissipation of the velocity field. To reduce the dissipation when simulating gaseous phenomena, Fedkiw et al. [2001] used cubic interpolation. They also included an additional step referred to as vorticity confinement that amplifies the curl of the velocity field, producing realistic swirly components in smoke movements. More physically based prevention of the vorticity dissipation was done [Selle et al. 2005; Park and Kim 2005] by employing the the vortex particle method. This method works with the curl version of the Navier-Stokes equations and utilizes particles to solve the advection term, which results in effective preservation of the vorticities. In the case of liquids, however, viscosity plays a more prominent role; in particular, swirly movements are short-lived and less frequently observed. Thus, modeling the behavior of high-Reynolds-number liquids requires a velocity-dissipation suppression technique that works in more general situations. To reduce dissipation in liquid simulations, Song et al. [2005] proposed a technique based on the CIP advection method. Their technique solves the velocity advection with third-order accuracy. However, the numerical viscosity that is coming from the grid-based advection cannot be avoided by this approach. Zhu and Bridson [2005] proposed a fluid simulation technique based on the FLuid-Implicit-Particle (FLIP) method. The FLIP method [Brackbill and Ruppel 1986] solves the advection step with particles, but all other steps on the grid. Although the particle advection in this method is free from numerical dissipation, interpolation errors are introduced when the velocity values are transferred back and forth between the grid and particles.

Accordingly, a need for a method of simulating detailed movements of fluids using derivative particles has been present for a long time. This invention is directed to solve these problems and satisfy the long-felt need.

SUMMARY OF THE INVENTION

The present invention contrives to solve the disadvantages of the prior art.

An object of the invention is to provide a method of simulating detailed movements of fluids using derivative particles.

Another object of the invention is to provide a method of simulating detailed movements of fluids using derivative particles, in which the advection part is implemented with the Lagrangian scheme.

Still another object of the invention is to provide a method of simulating detailed movements of fluids using derivative particles, which provides a procedure converting physical quantities at the switching of the advection and non-advection parts, suppressing intervention of unnecessary numerical dissipation.

3. Overview

In the development of a multi-phase fluid solver, the applicants assume that both air and water are incompressible. The Navier-Stokes equations for incompressible fluids can be written as $$\frac{\partial u}{\partial t} = -(u \cdot \nabla)u - \frac{\nabla p}{\rho} + \nabla \cdot (\mu \nabla u) + \frac{f}{\rho} \quad (1)$$

$$\nabla \cdot u = 0 \quad (2)$$

where u is the velocity, p is the pressure, f is the external force, $\mu$ is the viscosity coefficient, and $\rho$ is the fluid density. For accurate modeling of the discontinuity in the density and viscosity across the interface between the media, the applicants employ the ghost fluid method with variable density [Liu et al. 2000; Kang et al. 2000; Hong and Kim 2005]. In our solver, surface tracking is based on the level set method. The level set field $\phi$ is updated according to $$\frac{\partial \phi}{\partial t} + u \cdot \nabla \phi = 0 \quad (3)$$

with signed-distance condition $$|\nabla \phi| = 1 \quad (4)$$

For the time-integration of the Navier-Stokes equations, the applicants employ the fractional step method [Stam 1999] which incrementally accounts for the effects of the terms in Equation (1) and the mass conservation condition in Equation (2). The technique the applicants develop here focuses on the enhancement of the advection part. Hence the applicants group the fractional steps into two parts, a non-advection part and an advection part, as shown in FIG. 8. The time-integration of Equation (3) involves only the advection part.

The advection part consists of the grid advection part and the particle advection part. The grid advection part advects the velocity and level set fields calculated from the non-advection part according to the current velocity field. Our approach differs from pure Eulerian simulation in that our simulator includes the particle advection part, which is used to simulate regions where details need to be produced. For that purpose, the applicants introduce a number of particles in the neighborhood of the air-water interface.

In the grid advection part, Advect Velocity and Advect Level Set are Eulerian advection steps. Accurate handling of these steps forms the basis of successful simulation of high-Reynolds-number behaviors. For the Eulerian advection, the applicants develop an octree-based CIP solver (Section 4) that reduces both velocity and mass dissipation to a remarkable level.

When the advection of a fluid region needs to be simulated using the particle advection part, the physical quantities (e.g., the level set and velocity) that are currently defined on the grid are transferred to the particles. After this transfer, the particles can be advected straightforwardly. The results of the particle advection are then transferred back to the grid. At this point in the procedure, the final velocity and level set values are stored on the grid points, regardless of whether the simulation proceeded via the grid advection part or particle advection part. The applicants present the grid-to-particle and particle-to-grid velocity/level set conversion procedures in Section 5. Use of the particle-based advection and development of the conversion procedures are essential for reproducing the details of fluid movements.

A method for simulating detailed movements of fluids using derivative particles includes steps of a) modeling fluids with an adaptive grids based on octree data structure; b)

solving Navier-Stokes equations for incompressible fluids for fluid velocity at grid points; c) using a fractional step method in the time-integration of the Navier-Stokes equations; d) grouping the fractional steps into a non-advection part and an advection part; e) selecting a grid advection part or a particle advection part according to the degree of details of the simulation; f) using an octree-based CIP method for the grid advection part; and g) using a derivative particle model for the particle advection part.

The step of using a derivative particle model for the particle advection part is used when the degree of details of the simulation is high.

The adaptive grid increases the number of grids for a region of high interest in detail.

The octree data structure includes a tree data structure, and each internal node has up to eight children.

The Navier-Stokes equations for incompressible fluids can be written as $$\frac{\partial u}{\partial t} = -(u \cdot \nabla)u - \frac{\nabla p}{\rho} + \nabla \cdot (\mu \nabla u) + \frac{f}{\rho},$$

$$\nabla \cdot u = 0,$$

where u is the velocity, p is the pressure, f is the external force, $\mu$ is the viscosity coefficient, and $\rho$ is the fluid density.

The method may further include a step of using a level set method for tracking a surface of the fluids. The level set method comprises a level set field $\phi$. The level set field $\phi$ is updated according to $$\frac{\partial \phi}{\partial t} + u \cdot \nabla \phi = 0$$

with signed-distance $|\nabla \phi|=1$.

The time integration of $$\frac{\partial \phi}{\partial t} + u \cdot \nabla \phi = 0$$

involves only the advection part. The grid advection part advects the velocity and level set fields calculated from the non-advection part according to the current velocity field.

The grid advection part advects the velocity and the level set using Eulerian advection steps. The Eulerian advection is performed by the octree-based CIP (Contrained Interpolation Profile) method.

The step of using an octree-based CIP method for the grid advection part comprises a step of advecting the velocity and level set and their derivatives with the octre-based CIP method. The equation for advecting derivatives is obtained directly from the equation, $$\frac{\partial \phi}{\partial t} + u \cdot \nabla \phi = 0,$$

where $\phi$ is the physical quantity that is being advected, and an advecting equation of a derivative of a spatial variable x is obtained by differentiating the equation with respect to x, as $$\frac{\partial \phi_x}{\partial t} + u \cdot \nabla \phi_x = -u_x \cdot \nabla \phi.$$

The step of solving the advecting equation of a derivative of x includes a step of using the fractional step method is employed, and the step of using the fractional step method includes steps of a) solving the non-advection part $\partial \phi_x/\partial t = -u_x \cdot \nabla \phi$ using finite differencing method; b) advecting the result according to $$\frac{\partial \phi_x}{\partial t} + u \cdot \nabla \phi_x = 0;$$

and c) sampling a pressure value at the center of a cell defined by the grids and sampling the other values including velocity, level set, and their derivatives at the nodes.

The method may further include steps of a) combining the octree-based CIP method with the adaptive grids; and b) minimizing the octree artifact caused by the regional variation sin the grid resolution of the octree data structure by simulating the advection with the octree-based CIP method.

The derivative particle model uses a particle-based Lagrangian scheme. The level set and its derivative at the grid point is calculated with $$\phi(x) = \phi_p + \frac{\nabla \phi_p}{|\nabla \phi_p|} \cdot (x - x_p)$$

and $\nabla \phi(x) = \nabla \phi_p$, where p is the gradient carried by the derivative particle.

The method may further include steps of a) converting the velocity and level set defined on the grids to the velocity and level set defined on the particles before the step of using a derivative particle model for the particle advection part (Grid-to-Particle); and b) converting the velocity and level set defined on the particles to the velocity and level set defined on the grids before going back to the step of using an octree-based CIP model for the grid advection part (Particle-to-Grid).

The step of converting the velocity and level set Grid-to-Particle includes a step of using FLIP approach with a monotonic CIP interpolation instead of the linear interpolation for the conversion of velocity $u^P$, and $$u^P = u_-^P + \sum_{i=1}^{4} w_i \Delta u_i^G,$$

where $u^P$ is the particle velocity just before the commencement of the non-advection part and $\nabla u_i^G$ is the velocity change at $G_i$ due to the non-advection part.

In terms of the velocity $u^P$, a grid point G, the nearest particle $P_1$, $P_2$, $P_3$, and $P_4$ selected from each quadrant of G, the velocity of $P_j$, and the derivatives of the x- and y-components of $u_i^P$, $(u_{ix}^P, u_{iy}^P)$ and $(v_{ix}^P, v_{iy}^P)$, the step of converting the velocity and level set Particle-to-Grid includes steps of a) coordinate-transforming the derivative $(u_{1x}^P, u_{1y}^P)$ of $u_1^P$ into $(u_{1\parallel}, u_{1\perp})$, so that $u_{1\parallel}$ represents the component along the direction $\overline{P_1P_2}$, and $u_{1\perp}$ represents the component perpendicular to $\overline{P_1P_2}$, wherein the coordinate-transformed derivative $(u_{2\|}, u_{2\perp})$ of $u_2^P$ is obtained similarly; b) performing, on the results obtained in the step (a), one-dimensional monotonic CIP interpolation along the direction $\overline{P_1P_2}$ in order to calculate $u_A$ and its $\overline{P_1P_2}$-directional derivative $(u_{A\|}, u_{A\perp})$ at the location A; c) obtaining $(u_{Ax}, u_{Ay})$ from $(u_{A\|}, u_{A\perp})$ by applying the inverse of the above coordinate-transformation; d) performing steps (a) ~ (c) for the particles $P_3$ and $P_4$ to calculate $u_B$ and $(u_{Bx}, u_{By})$ of B; and e) performing, on the results obtained in steps (c) and (d), y-directional monotonic CIP interpolation, which gives the velocity and derivative at G.

The step of using a derivative particle model for the partical advection part comprises includes steps of a) adjusting particles' level set value; and b) performing a particle-reseeding.

The advantages of the present invention are: (1) the method of simulating detailed movements of fluids using derivative particles reduces the dissipation of both mass and velocity leading to realistic reproduction of dynamic fluids; (2) the method of simulating detailed movements of fluids using derivative particles implements the advection part with the Lagrangian scheme; and (3) the method of simulating detailed movements of fluids using derivative particles provides the particle-to-grid and grid-to-particle procedures.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

4. Developing the Octree-based CIP Solver

Figure 1:
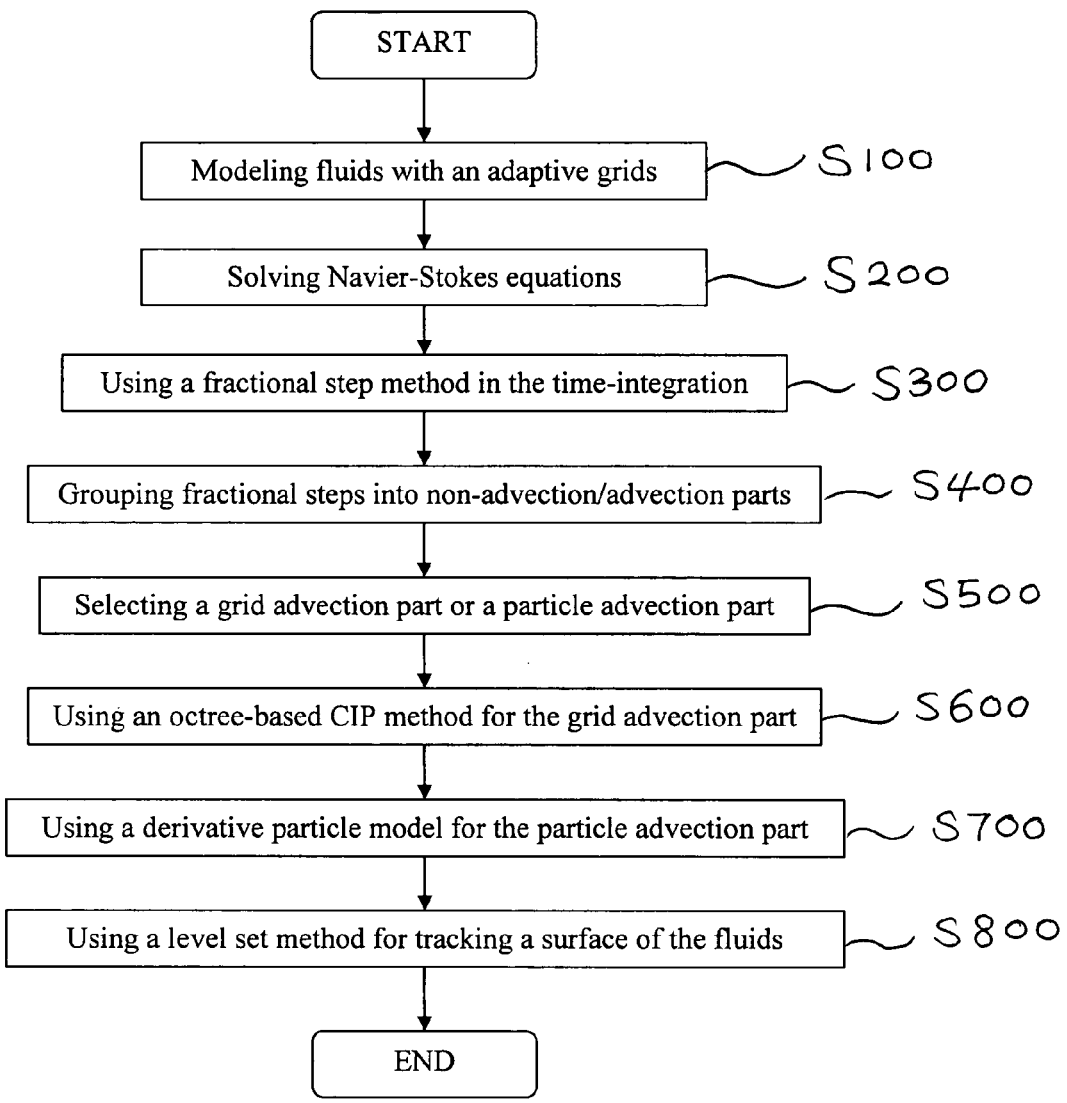
FIG. 1 is a flow chart showing a method of simulating detailed movements of fluids using derivative particles according to the invention.

This section describes the development of the grid advection part of the simulator by combining the CIP method with the octree data structure.

4.1 Introduction to the CIP Method

In solving the Navier-Stokes equations with the fractional step method (Section 3), the advection terms $u \cdot \nabla u$ and $u \cdot \nabla \phi$ require special attention due to their hyperbolic nature. The semi-Lagrangian method provides a stable framework within which to handle the above hyperbolic equations [Stam 1999]. Unfortunately, however, this method suffers from severe numerical diffusion arising from the linear interpolation that is used to determine the physical quantities at the backtracked non-grid point from those at neighboring grid points.

Meanwhile, the CIP method is a third-order technique originally proposed by Yabe and Aoki [1991a; 1991b] and subsequently improved by Yabe et al. [2001]. The key idea of this method is to advect not only the physical quantities but their derivatives as well. Here, a question would be how to advect the derivatives. An interesting observation of Yabe and Aoki [1991a] was that the equation for advecting derivatives can be obtained directly from the original hyperbolic equation $$\frac{\partial \phi}{\partial t} + u \cdot \nabla \phi = 0 \tag{5}$$

where $\phi$ is the physical quantity that is being advected. Differentiating Equation (5) with respect to the spatial variable x, the applicants obtain $$\frac{\partial \phi_x}{\partial t} + u \cdot \nabla \phi_x = -u_x \cdot \nabla \phi \tag{6}$$

which can be used to predict the evolution of x over time. In solving Equation (6), once again the applicants employ the fractional step method: first, the applicants solve the non-advection part $\partial \phi_x/\partial t = -u_x \cdot \nabla \phi$ using finite differencing; then the applicants advect the result according to $$\frac{\partial \phi_x}{\partial t} + u \cdot \nabla \phi_x = 0 \tag{7}$$

A detailed introduction to CIP advection can be found in [Song et al. 2005]. The extension of the above approach to two- and three-dimensional cases is presented in [Yabe and Aoki 1991b]. Song et al. [2005] found that the generalization given in [1991b] can lead to instabilities, and proposed a modification that fixes this problem. In the present work, for solving the advection part, the applicants adopt the CIP method with 2nd-order Runge-Kutta time integration.

4.2 Combining CIP with Adaptive Octree Grids

The use of adaptive grids based on an octree data structure, which was introduced by Losasso et al. [2004], allows simulations to be performed with inhomogeneous accuracy throughout the fluid. This approach is useful from a practical standpoint, since it allows more interesting regions such as surfaces to be simulated with higher accuracy by introducing small amounts of additional computation and memory. Here the applicants adopt this octree data structure, and propose that the practical value of this adaptive approach can be further improved by combining it with the CIP method.

Losasso et al. [2004] use linear interpolation for the semi-Lagrangian advection step. If, however, the applicants replace the linear interpolation with CIP-interpolation, the advection will have third-order accuracy. As in Guendelman et al. [2005], the applicants sample the pressure value at the cell center, but sample all other quantities—velocity, level set, and their derivatives—at the nodes. When a cell is refined, the values at the new grid points are CIP-interpolated by referring to all the derivative values.

We note that the CIP method fits very well with the octree data structure because, although it has third order spatial accuracy, it is defined over a single grid cell stencil rather than over multiple stencils. Due to this compactness, the applicants can use the CIP method for simulating adaptive grids without any major modification. By contrast, extension of the method from first-order to third-order would be difficult for higher-order schemes that are defined over multiple stencils: as the simulation adaptively refines the grid, cells with different sizes will be produced, which makes the development of multi-stencil-higher-order schemes problematic.

We would also note a feature that the applicants refer to as the octree artifact. Regional variations in the grid resolution of the octree data structure produce variations in the amount of dissipation. Regional variations in the mass dissipation are not noticeable. For the velocity dissipation, however, the regional differences can be noticeable, especially for rapid fluid motions. In the simulation of breaking-dam, for example, water undergoes fast lateral movements. The fluid near the surface, where the resolution is high, experiences small amounts of numerical diffusion and thus makes swift movements. The fluid at the bottom, by contrast, moves in a manner characteristic of a more viscous fluid due to the low grid resolution. When these two types of motion appear together, the upper part of the water appears to be crawling over the lower part. Higher order schemes, including CIP, are not free from this kind of artifact. However, the artifact is less noticeable when the advection is simulated using the octree-based CIP solver proposed in the present work; the applicants attribute this improvement to an overall reduction in numerical dissipation, especially in the low-resolution regions.

5. Derivative Particle Model

In the aspect of momentum/mass conservation, the particle-based Lagrangian scheme is more accurate than the grid-based Eulerian scheme. Hence, the applicants apply the Lagrangian scheme to regions that need to be simulated in greater detail. However, this approach has its own limitations in regard to surface tracking and pressure/viscosity calculation. Therefore the applicants apply the approach only to the simulation of the advection part; all other parts of the simulation are based on the Eulerian scheme. Switching between the Lagrangian and Eulerian schemes requires grid-to-particle and particle-to-grid conversion of the physical quantities (velocity and level set values). The procedures for performing these conversions should be carefully developed so that they do not introduce unnecessary numerical diffusion. In this section the applicants present novel conversion procedures that do not impair the desirable characteristics of the Lagrangian advection, which is an essential component enabling the reproduction of the small scale features in high-Reynolds-number fluids. For simplicity, the description of this section is done for 2D.

5.1 Grid-to-Particle Velocity Conversion

Figure 8:
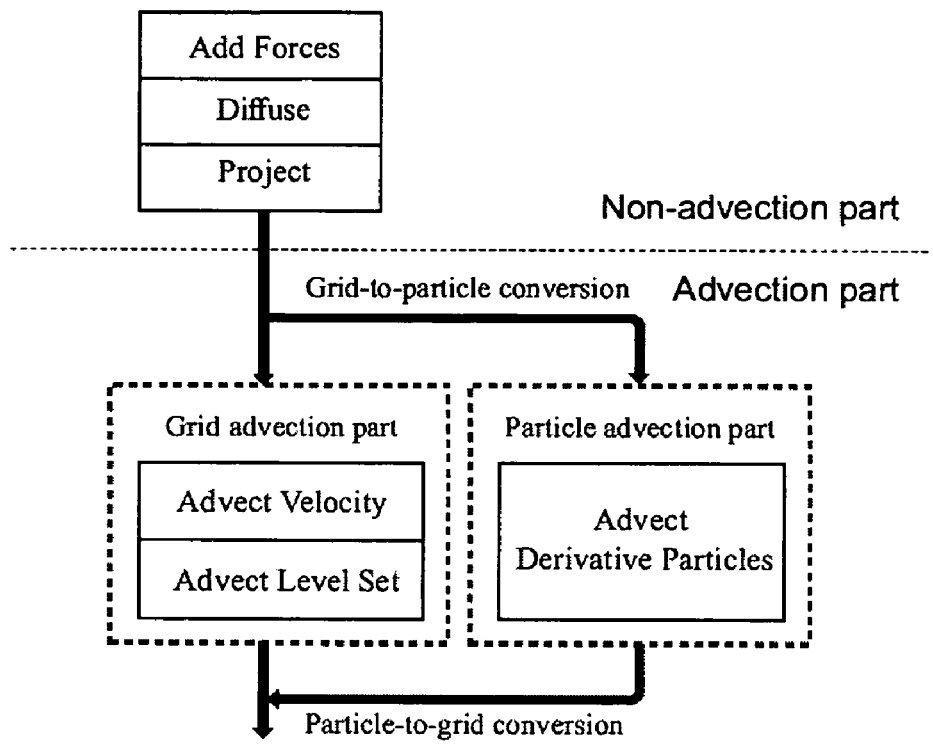
FIG. 8 shows an architecture of the method according to the invention.

At the end of the non-advection part shown in FIG. 8, (1) the velocities that need to be advected are stored at the grid points, and (2) a number of particles are scattered over the grid. The particle advection part must find out the velocities of the particles so that their velocities and level set values make Lagrangian movements. Suppose that a particle P is in the cell defined by four grid points $G_1$, $G_2$, $G_3$, and $G_4$. Let $u^G_i = (u^G_i, v^G_i)$ be the grid velocities at $G_i$ for $i \in \{1,2,3,4\}$. The applicants are looking for the formula that can be used for the velocity $u^P = (u^P, v^P)$ of P.

One possible approach, which was used in the particle-in-cell method [Harlow 1963], would be to use the bi-linear interpolation $$u^P = \sum_{i=1}^{4} w_i u^G_i,$$

where $w_i$ are the bi-linear weights determined based on the particle position P. Unfortunately, this conversion introduces severe numerical diffusion. In the FLIP method [Brackbill and Ruppel 1986], only the incremental parts of the grid velocities are transferred to the particle velocity. Namely, $$u^P = u^P_- + \sum_{i=1}^{4} w_i \Delta u^G_i,$$

where $u^P_-$ is the particle velocity just before the commencement of the non-advection part and $\nabla u^G_i$ is the velocity change at $G_i$ due to the non-advection part. This approach has been shown to reduce numerical diffusion conspicuously [Zhu and Bridson 2005]. Hence, in the development of the grid-to-particle velocity conversion procedure, the applicants use the FLIP approach, but with monotonic CIP interpolation [Song et al. 2005] instead of linear interpolation. This not only gives up but also $$\left(\frac{\partial}{\partial x} u^P, \frac{\partial}{\partial y} u^P\right) \text{ and } \left(\frac{\partial}{\partial x} v^P, \frac{\partial}{\partial y} v^P\right).$$

5.2 Particle-to-Grid Velocity Conversion

Suppose that each particle has moved according to the velocity $u^P$, carrying the spatial derivatives of the velocity as well as the velocity itself. The applicants must now develop a procedure to transfer the consequences of the particle advections to the grid. The particle-to-grid velocity conversion is more complicated than the grid-to-particle conversion.

Figure 9:
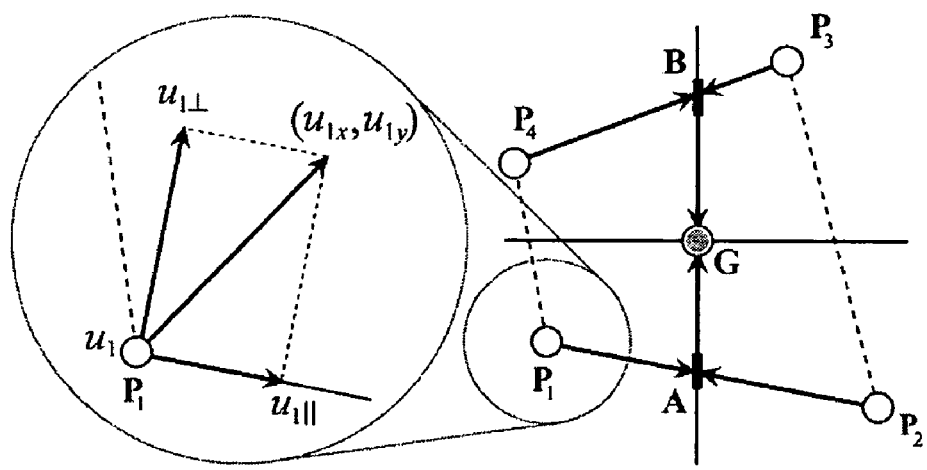
FIG. 9 shows a calculation of the grid velocity from the particle velocities.

Referring to FIG. 9, let G be a grid point. From each quadrant of G the applicants select the nearest particle, namely, $P_1$, $P_2$, $P_3$, and $P_4$. Let be the velocity of $P_i$, and let $(u^P_{ix}, u^P_{iy})$ and $(v^P_{ix}, v^P_{iy})$ be the derivatives of the x- and y-components of $u^P_i$, respectively. The applicants must find formulae for the velocity $u^G = (u^G, v^G)$ at G and its spatial derivatives. Because the four particles are not rectangularly located, the applicants cannot use conventional grid-based CIP interpolation.

Our particle-to-grid velocity conversion is composed of the following steps. For simplicity, the applicants only show the calculation for the x-components.

(1) The applicants coordinate-transform the derivative $(u_{1x}{}^P, u_{1y}{}^P)$ of $u_1{}^P$ into $(u_{1\|}, u_{1\perp})$, so that $u_{1\|}$ represents the component along the direction $\overline{P_1P_2}$ and $u_{1\perp}$ represents the component perpendicular to $\overline{P_1P_2}$. Similarly, the applicants obtain the coordinate-transformed derivative $(u_{2\|}, u_{2\perp})$ of $u_2{}^P$.

(2) On the results obtained in Step (1), the applicants perform one-dimensional monotonic CIP interpolation along the direction $\overline{P_1P_2}$ in order to calculate $u_A$ and its $\overline{P_1P_2}$-directional derivative $(u_{A\|}, u_{A\perp})$ at the location A.

(3) The applicants obtain $(u_{Ax}, u_{Ay})$ from $(u_{A\|}, u_{A\perp})$ by applying the inverse of the above coordinate-transformation.

(4) Similarly, the applicants perform Steps (1)~(3) for the particles $P_3$ and $P_4$ to calculate $u_B$ and $(u_{Bx}, u_{By})$ of B.

(5) On the results obtained in Steps (3) and (4), the applicants perform y-directional monotonic CIP interpolation, which gives the velocity and derivative at G.

This monotonic interpolation method can be straightforwardly extended to the 3D case. The applicants note that the present work does not employ general radial basis interpolation schemes because (1) they do not exploit the derivative information, and (2) modifying the schemes so that they reflect the derivatives but maintain the monotonicity turns out to be difficult.

5.3 The Level Set Conversion

The level set conversion should be performed differently from the velocity conversion; level set values represent the minimum distances to the surface, so the conversion should not be based on interpolation. Here the applicants use a modified, and more accurate, version of a widely used level set conversion procedure [Enright et al. 2002a; Enright et al. 2002b].

In the original particle level set method, a spherical implicit function $\phi(x) = s_p(|\phi_p| - |x - x_p|)$ is used to calculate the level set value at grid point x, where p is the level set of the particle, and $s_p = +1(-1)$ for the positive (negative) particles. In the present work, utilizing the derivative information stored in the derivative particle, the applicants calculate the level set and its derivative at the grid point with $$\phi(x) = \phi_p + \frac{\nabla \phi_p}{|\nabla \phi_p|} \cdot (x - x_p) \quad (8)$$

$$\nabla \phi(x) = \nabla \phi_p, \quad (9)$$

where p is the gradient carried by the derivative particle. Because Equation (8) is based on the gradient-directional distance rather than the Euclidean distance, it produces more accurate results than the spherical implicit function. Except for the above modifications, the conversion procedure is identical to that presented in Enright et al. [2002a].

6. Experimental Results

The technique presented in the present invention was implemented on a Power Mac with Dual G5 2.5 GHz processors and 5.5 GB of memory. The applicants used the program to simulate several experimental situations that produce high-Reynolds-number fluid behaviors in the real world. In the experiments, the applicants solved two-phase fluid consisting of water and air with the following constants: $g = 9.8$ m/sec², $\rho_{water} = 1000$ kg/m³, $\mu_{water} = 1.137 \times 10^3$ kg/ms, $\rho_{air} = 1.226$ kg/m³, and $\mu_{air} = 1.78 \times 10^5$ kg/ms, where g is gravity. Extraction of water surface was done using the marching cube algorithm, and rendering was done by mental ray®.

Figure 10:
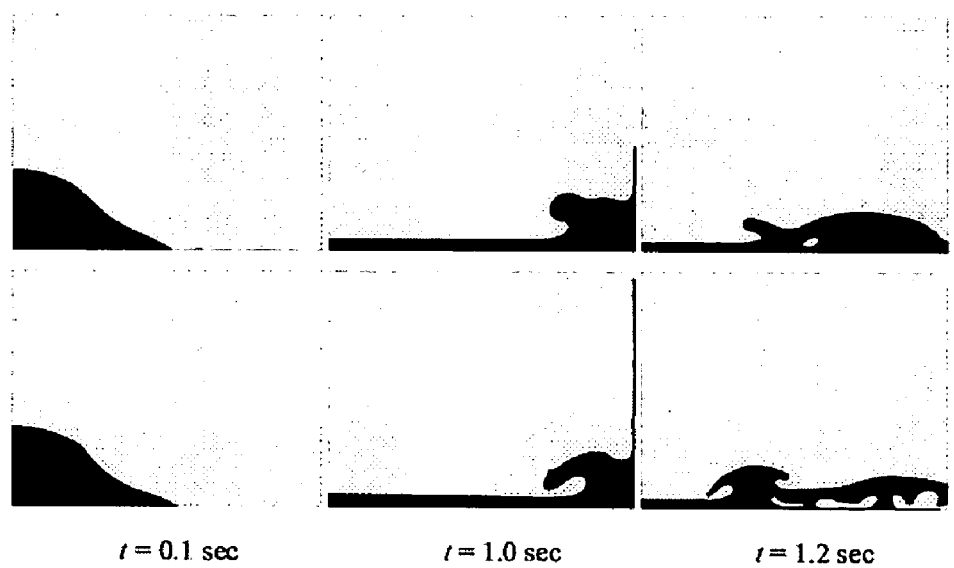
FIG. 10 shows snapshots taken from 2D breaking-dam simulation: the upper and the lower sequences show the results produced with the traditional linear model with the particle level set method and the derivative particle model, respectively.

Breaking-dam: In order to compare the numerical diffusion between the derivative particle model and the linear model with the particle level set method, the applicants performed 2D breaking-dam test with $128^2$ effective resolution, in which $0.2 \times 0.4$ m water column was released in the gravity field. FIG. 10 shows the results. The applicants can see that derivative particles produce less diffusive result: breaking of the wave is sharper and vorticities are well conserved.

Figure 11:
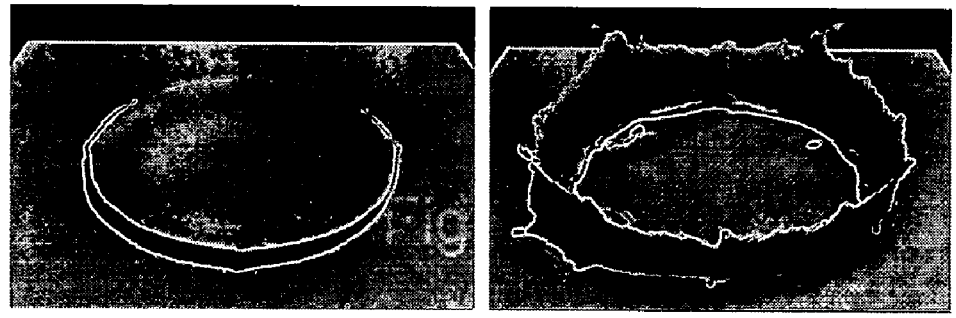
FIG. 11 shows snapshots taken from the water drop simulation: the left and right images show the results produced with the traditional linear model with the particle level set method and the derivative particle model, respectively.

A Chunk of Water Dropping onto Shallow Water: FIG. 11 shows a snapshot taken from the simulation in which a chunk of water is dropped onto a 0.05-m deep water reservoir. The applicants used the no-slip boundary condition for the bottom surface of the reservoir, which caused the water to move fast at the top but slow at the bottom, resulting in a crown-like splash. This experiment was performed with an effective grid resolution of $256^3$. The same scene was also simulated with the traditional linear model that uses the particle level set method. The comparison demonstrates that the proposed technique produces a more realistic result. The derivative particle model took 60 sec per time-step in average while the linear model took 30 sec per time-step in average, both including the file output time.

Figure 7:
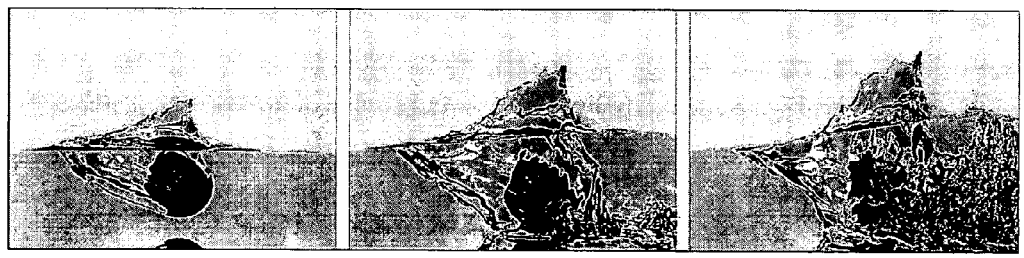
FIG. 7 shows a simulated results of of water generated by the impact of a ball.

Impact of a Solid Ball: In this experiment, a solid ball with radius 0.15 m makes an impact into water, with the velocity (5.0, −3.0, 0.0) m/sec. The impact generates complex structures shown in FIG. 7. This experiment manifests that the proposed technique can produce detailed fluid movements and surface features that occur in violent solid-water-air interactions. The effective resolution of this experiment was $192 \times 128 \times 128$.

Figure 12:
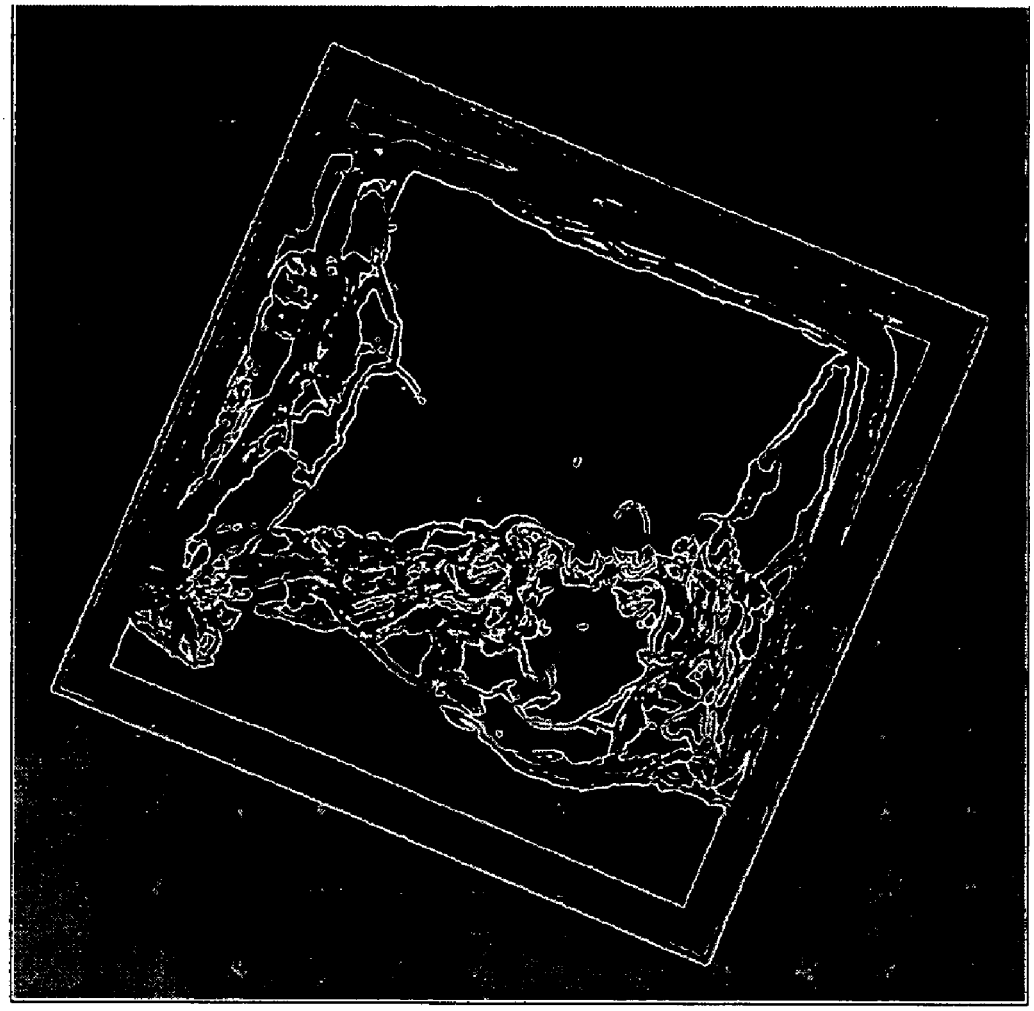
FIG. 12 shows a snapshot taken from the simulation of a rotating water tank.

Rotating Water Tank: FIG. 12 shows a $0.9 \times 0.9 \times 0.3$ m rotating box with half-full of water. In the experiments, the centrifugal force creates the effect of pushing the water to the side of the tank. This simulation was performed with an effective grid resolution of $96 \times 96 \times 32$. This experiment demonstrates that the derivative particle model can simulate complex movements of fluids even in a coarse-resolution grid.

Figure 13:
FIG. 13 shows snapshots taken from the flood simulation: the three images in the bottom row show progression of the flood (top view); the top image shows a side view.

A Flood: In this experiment, the applicants simulated a mid-large scale flood that occurs over a 6 m×2 m×4 m domain. Snapshots taken from this experiment are shown in FIG. 13. When the dam is removed, the water starts to slide down the stairs. Due to the obstacles on the way, the water makes violent movements creating complex geometrical shapes. The effective resolution of this experiment was $384 \times 128 \times 256$.

FIGS. 1 through 6 show flow charts for the invention.

A method for simulating detailed movements of fluids using derivative particles includes steps of a) modeling fluids with an adaptive grids based on octree data structure (S100); b) solving Navier-Stokes equations for incompressible fluids for fluid velocity at grid points (S200); c) using a fractional step method in the time-integration of the Navier-Stokes equations (S300); d) grouping the fractional steps into a non-advection part and an advection part (S400); e) selecting a grid advection part or a particle advection part according to the degree of details of the simulation (S500); f) using an octree-based CIP method for the grid advection part (S600); and g) using a derivative particle model for the particle advection part (S700) as shown in FIG. 1 through FIG. 6.

The step (S700) of using a derivative particle model for the particle advection part is used when the degree of details of the simulation is high.

The adaptive grid increases the number of grids for a region of high interest in detail.

The octree data structure includes a tree data structure, and each internal node has up to eight children.

The Navier-Stokes equations for incompressible fluids can be written as $$\frac{\partial u}{\partial t} = -(u \cdot \nabla)u - \frac{\nabla p}{\rho} + \nabla \cdot (\mu \nabla u) + \frac{f}{\rho},$$

$$\nabla \cdot u = 0,$$

where u is the velocity, p is the pressure, f is the external force, $\mu$ is the viscosity coefficient, and $\rho$ is the fluid density.

Figure 2:
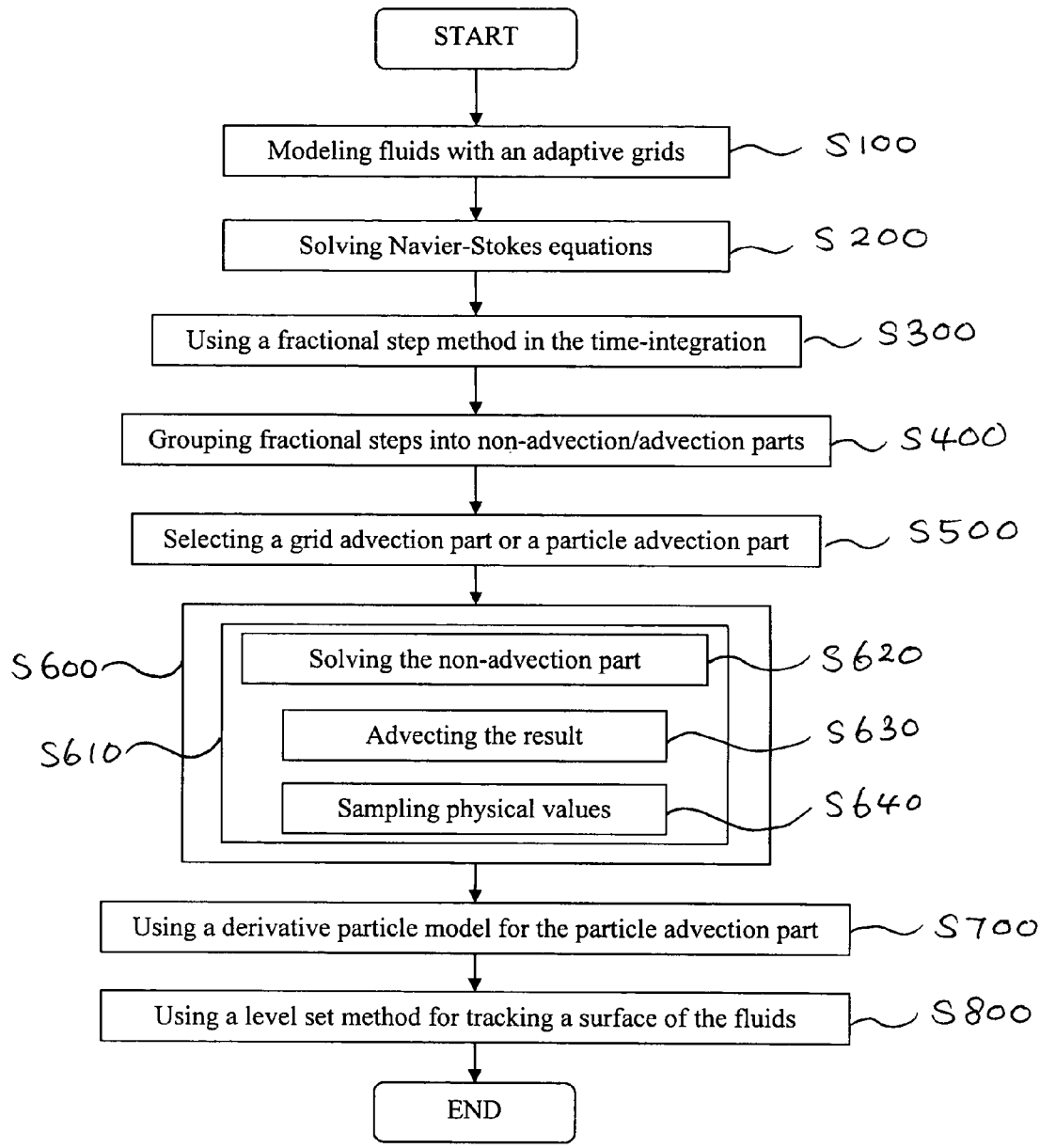
FIG. 2 is another flow chart showing the method according to the invention.
Figure 3:
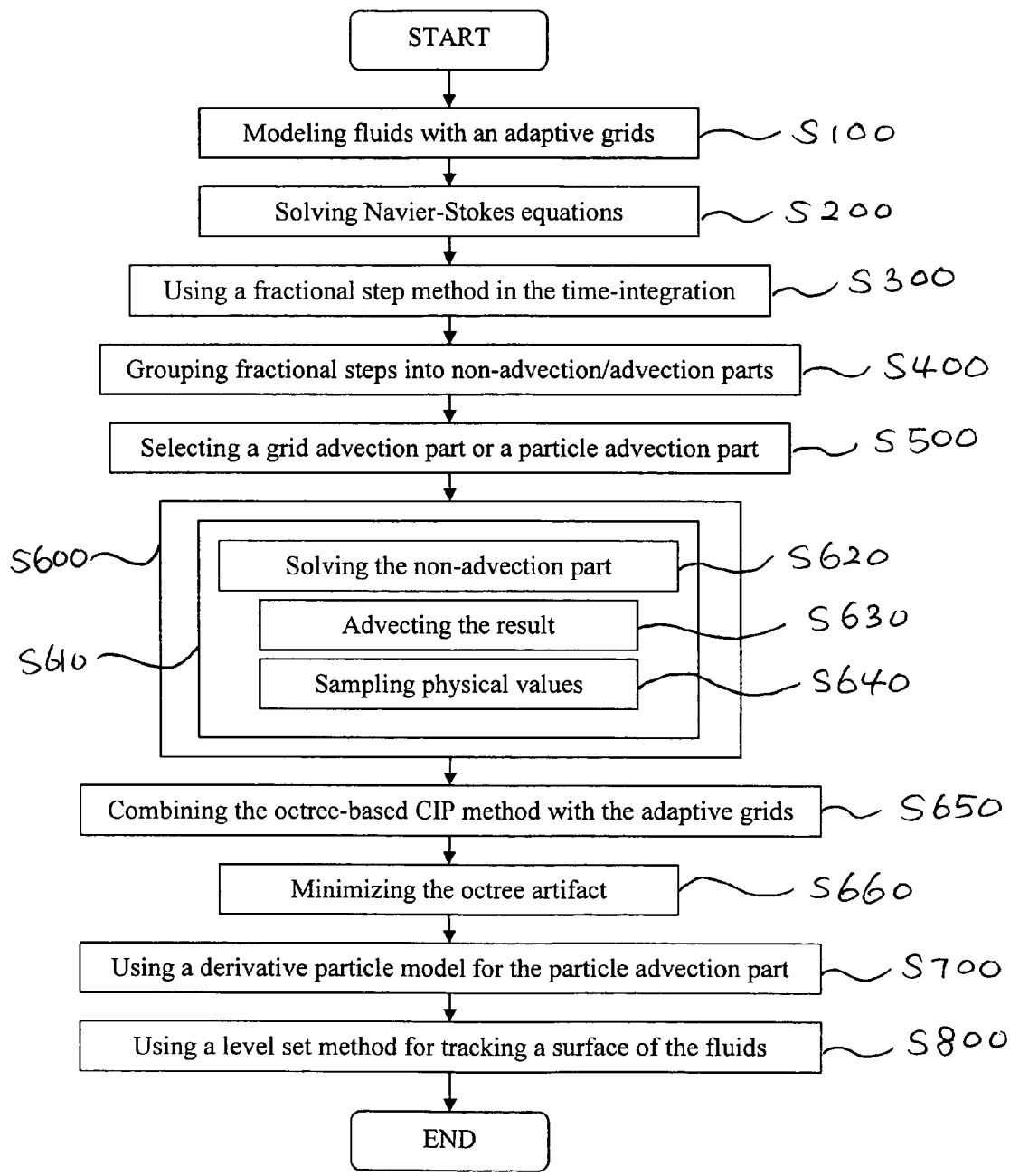
FIG. 3 is still another flow chart showing the method according to the invention.
Figure 4:
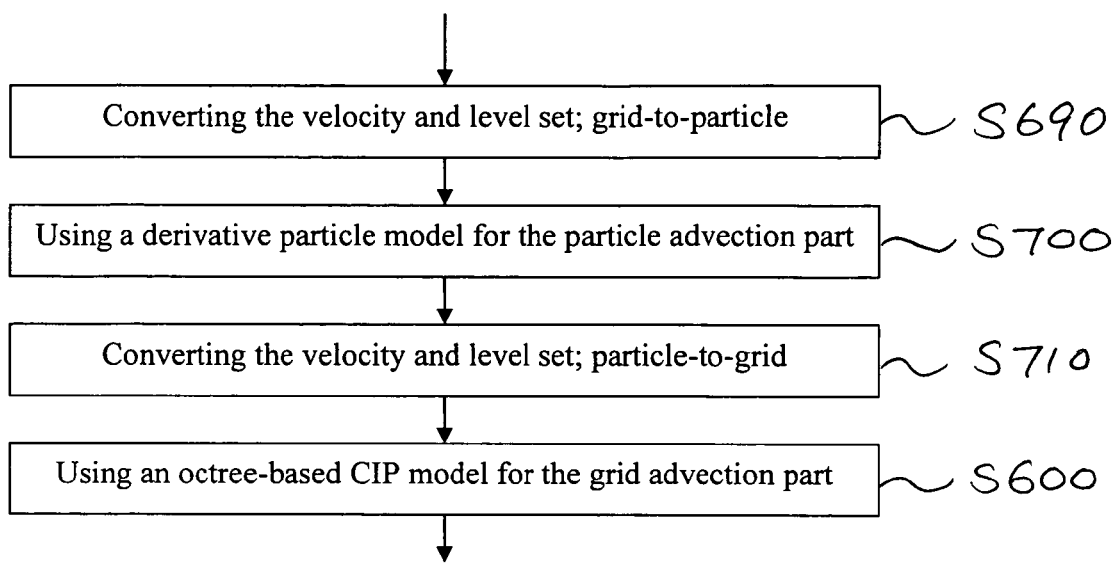
FIG. 4 is a part of a flow chart showing grip-to-particle and particle-to-grid conversions.

The method may further include a step (S800) of using a level set method for tracking a surface of the fluids. The level set method comprises a level set field $\phi$ as shown in FIG. 1 through FIG. 3. The level set field $\phi$ is updated according to $$\frac{\partial \phi}{\partial t} + u \cdot \nabla \phi = 0$$

with signed-distance $|\nabla \phi|=1$.

The time integration of $$\frac{\partial \phi}{\partial t} + u \cdot \nabla \phi = 0$$

involves only the advection part. The grid advection part advects the velocity and level set fields calculated from the non-advection part according to the current velocity field.

The grid advection part advects the velocity and the level set using Eulerian advection steps. The Eulerian advection is performed by the octree-based CIP (Contrained Interpolation Profile) method.

The step (S600) of using an octree-based CIP method for the grid advection part comprises a step (S610) of advecting the velocity and level set and their derivatives with the octre-based CIP method. The equation for advecting derivatives is obtained directly from the equation, $$\frac{\partial \phi}{\partial t} + u \cdot \nabla \phi = 0,$$

where $\phi$ is the physical quantity that is being advected, and an advecting equation of a derivative of a spatial variable x is obtained by differentiating the equation with respect to x, as $$\frac{\partial \phi_x}{\partial t} + u \cdot \nabla \phi_x = -u_x \cdot \nabla \phi.$$

The step (S610) of solving the advecting equation of a derivative of x includes a step of using the fractional step method is employed, and the step of using the fractional step method includes steps of a) solving the non-advection part $\partial \phi_x / \partial t = -u_x \cdot \nabla \phi$ using finite differencing method (S620); b) advecting the result according to $$\frac{\partial \phi_x}{\partial t} + u \cdot \nabla \phi_x = 0$$

(S630); and c) sampling a pressure value at the center of a cell defined by the grids and sampling the other values including velocity, level set, and their derivatives at the nodes (S640) as shown in FIG. 2 and FIG. 3.

The method may further include steps of a) combining the octree-based CIP method with the adaptive grids (S650); and b) minimizing the octree artifact caused by the regional variation sin the grid resolution of the octree data structure by simulating the advection with the octree-based CIP method (S660) as shown in FIG. 3.

The derivative particle model uses a particle-based Lagrangian scheme. The level set and its derivative at the grid point is calculated with $$\phi(x) = \phi_p + \frac{\nabla \phi_p}{|\nabla \phi_p|} \cdot (x - x_p)$$

and $\nabla \phi(x) = \nabla \phi_p$, where p is the gradient carried by the derivative particle.

The method may further include steps of a) converting the velocity and level set defined on the grids to the velocity and level set defined on the particles (S690) before the step (S700) of using a derivative particle model for the particle advection part (Grid-to-Particle); and b) converting the velocity and level set defined on the particles to the velocity and level set defined on the grids (S710) before going back to the step (S600) of using an octree-based CIP model for the grid advection part (Particle-to-Grid).

The step (S690) of converting the velocity and level set Grid-to-Particle includes a step (S692) of using FLIP approach with a monotonic CIP interpolation instead of the linear interpolation for the conversion of velocity $u^P$, and $$u^P = u_-^P + \sum_{i=1}^{4} w_i \Delta u_i^G,$$

where $u^P$ is the particle velocity just before the commencement of the non-advection part and $\Delta u_i^G$ is the velocity change at $G_i$ due to the non-advection part.

Figure 5:
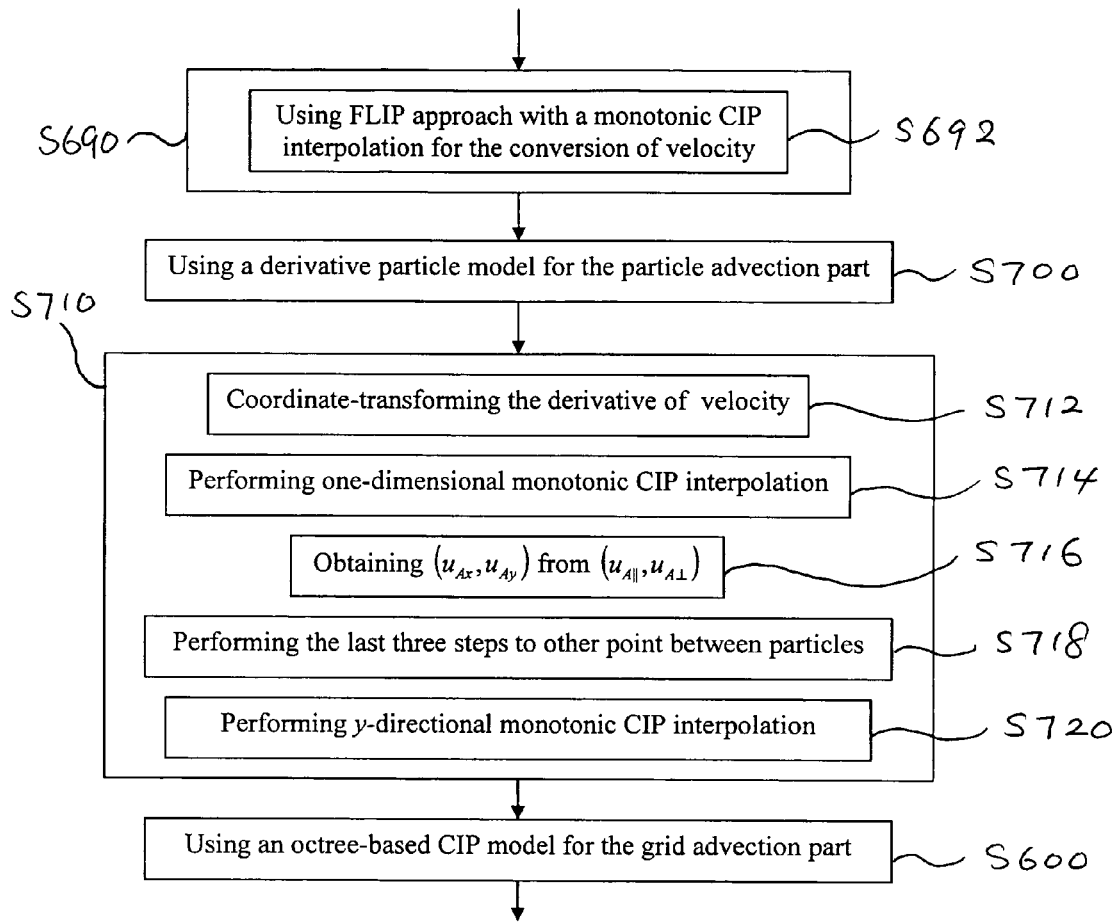
FIG. 5 is another part of the flow chart showing grip-to-particle and particle-to-grid conversions.

In terms of the velocity $u^P$, a grid point G, the nearest particle $P_1$, $P_2$, $P_3$, and $P_4$ selected from each quadrant of G, the velocity of $P_i$, and the derivatives of the x- and y-components of $u_i^P$, $(u_{ix}^P, u_{iy}^P)$ and $(v_{ix}^P, v_{iy}^P)$, the step (S710) of converting the velocity and level set Particle-to-Grid includes steps of a) coordinate-transforming the derivative $(u_{1x}^P, u_{1y}^P)$ of $u_1^P$ into $(u_{1\|}, u_{1\perp})$, so that $u_{1\|}$ represents the component along the direction $\overline{P_1 P_2}$ and $u_{1\perp}$ represents the component perpendicular to $\overline{P_1 P_2}$, wherein the coordinate-transformed derivative $(u_{2\|}, u_{2\perp})$ of $u_2^P$ is obtained similarly (S712); b) performing, on the results obtained in the step (a), one-dimensional monotonic CIP interpolation along the direction $\overline{P_1 P_2}$ in order to calculate $u_A$ and its $\overline{P_1 P_2}$-directional derivative $(u_{A\|}, u_{A\perp})$ at the location A (S714); c) obtaining $(u_{Ax}, u_{Ay})$ from $(u_{A\|}, u_{A\perp})$ by applying the inverse of the above coordinate-transformation (S716); d) performing steps (a)~(c) for the particles $P_3$ and $P_4$ to calculate $u_B$ and $(u_{Bx}, u_{By})$ of B (S718); and e) performing, on the results obtained in steps (c) and (d), y-directional monotonic CIP interpolation, which gives the velocity and derivative at G (S720) as shown in FIG. 5.

Figure 6:
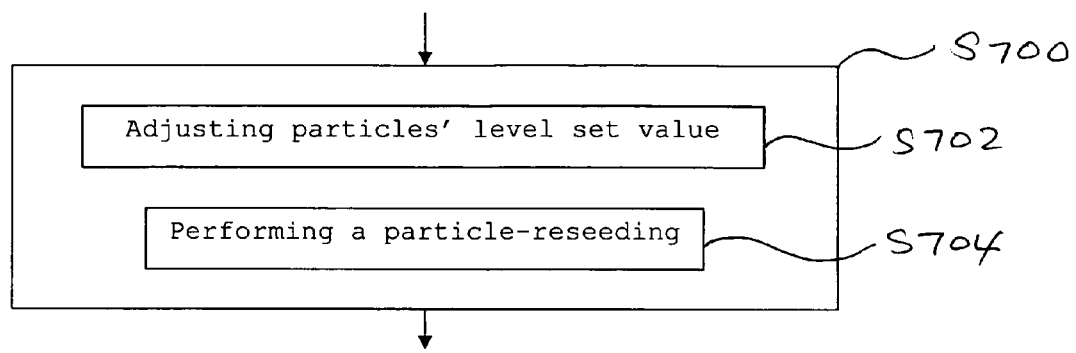
FIG. 6 is a part of flow chart showing details of a step of using a derivative particle model.

The step of using a derivative particle model for the partical advection part comprises includes steps of a) adjusting particles' level set value (S702); and b) performing a particle-reseeding (S704) as shown in FIG. 6.

7. Conclusion

In the present invention, the applicants have introduced a new concept called the derivative particle, and proposed a fluid simulation technique that increases the accuracy of the advection part. The non-advection part of the simulator is implemented using the Eulerian scheme, whereas the advection part is implemented using the Lagrangian scheme. A nontrivial problem in developing simulators that combine schemes in this way is how to convert physical quantities at the switching of the advection and non-advection parts. The applicants successfully overcame this problem by developing conversion procedures that effectively suppress unnecessary numerical dissipation. In the fluid regions where the particle advection does not need to be performed, the advection is simulated using an octree-based CIP solver, which the applicants developed in this work by combining CIP interpolation with the octree data structure. This approach also served to reduce numerical dissipation. The results of several experiments demonstrated that the proposed technique significantly reduces velocity dissipation, leading to realistic reproduction of dynamic fluids.

The present work would not have been possible without the pioneering work of previous researchers. The idea of entirely using particles to solve the advection part came from the PIC [Harlow 1963] and FLIP [Brackbill and Ruppel 1986] methods, but for the particle-to-grid and grid-to-particle velocity conversion the applicants used derivative-based cubic interpolation instead of the linear interpolation. In addition, the notion of letting the particles carry the level set values came from the particle level set method [Enright et al. 2002b]. This model was extended in the present work so that particles also carry the velocity information. Moreover, utilizing the derivative information came from the CIP method [Yabe et al. 2001]. Here the applicants extended the application of this method to particles, which entailed the development of a particle-to-grid velocity conversion procedure that contained an extension of the CIP method itself: the CIP interpolation of the particles in non-rectangular configurations.

In the experiments, the ability of reproducing the details was emphasized. But the proposed technique can also apply to large scale fluid movements to produce accurate results. The technique involves increased amount of memory for storing the derivative information. However, the applicants demonstrated that a 2563 grid can be simulated on a contemporary PC, which is already a viable resolution for portraying interesting fluid scenes.

While the invention has been shown and described with reference to different embodiments thereof, it will be appreciated by those skilled in the art that variations in form, detail, compositions and operation may be made without departing from the spirit and scope of the invention as defined by the accompanying claims.

REFERENCES

BRACKBILL, J. U., AND RUPPEL, H. M. 1986. Flip: A method for adaptively zoned, particle-in-cell calculations of fluid flows in two dimensions. *J. Comp. Phys.* 65, 314-343.

CARLSON, M., MUCHA, R. J., AND TURK, G. 2004. Rigid fluid: Animating the interplay between rigid bodies and fluid. *ACM Transactions on Graphics* 23, 3, 377-384.

ENRIGHT, D., FEDKIW, R., FERZIGER, J., AND MITCHELL, I. 2002. A hybrid particle level set method for improved interface capturing. *J. Comp. Phys.* 183, 83-116.

ENRIGHT, D., MARSCHNER, S., AND FEDKIW, R. 2002. Animation and rendering of complex water surfaces. *ACM Transactions on Graphics* 21, 3, 736-744.

ENRIGHT, D., LOSASSO, F., AND FEDKIW, R. 2005. A fast and accurate semi-lagrangian particle level set method. *Computers and Structures* 83, 479-490.

FEDKIW, R., STAM, J., AND JENSEN, H. W. 2001. Visual simulation of smoke. *Computer Graphics (Proc. ACM SIGGRAPH* 2001) 35, 15-22.

FELDMAN, B. E., O'BRIEN, J. F., AND ARIKAN, O. 2003. Animating suspended particle explosions. *ACM Transactions on Graphics* 22, 3, 708-715.

FELDMAN, B. E., O'BRIEN, J. F., AND KLINGNER, B. M. 2005. Animating gases with hybrid meshes. *ACM Transactions on Graphics* 24, 3, 904-909.

FELDMAN, B. E., O'BRIEN, J. F., KLINGNER, B. M., AND GOKTEKIN, T. G. 2005. Fluids in deforming meshes. In *Proceedings of Eurographics/ACM SIGGRAPH Symposium on Computer Animation* 2005, 255-259.

FOSTER, N., AND FEDKIW, R. 2001. Practical animation of liquids. *Computer Graphics (Proc. ACM SIGGRAPH* 2001) 35, 23-30.

FOSTER, N., AND METAXAS, D. 1996. Realistic animation of liquids. *Graphical models and image processing: GMIP* 58, 5, 471-483.

FOSTER, N., AND METAXAS, D. 1997. Controlling fluid animation. In *Computer Graphics International* 97, 178-188.

GOKTEKIN, T. G., BARGTEIL, A. W., AND O'BRIEN, J. F. 2004. A method for animating viscoelastic fluids. *ACM Transactions on Graphics* 23, 3, 463-468.

GUENDELMAN, E., SELLE, A., LOSASSO, F., AND FEDKIW, R. 2005. Coupling water and smoke to thin deformable and rigid shells. *ACM Transactions on Graphics* 24, 3, 973-981.

HARLOW, F. H. 1963. The particle-in-cell method for numerical solution of problems in fluid dynamics. In *Experimental arithmetic, high-speed computations and mathematics*.

HONG, J.-M., AND KIM, C.-H. 2005. Discontinuous fluids. *ACM Transactions on Graphics* 24, 3, 915-920.

KANG, M., FEDKIW, R., AND LIU, X.-D. 2000. A boundary condition capturing method for multiphase incompressible flow. *J. Sci. Comput.* 15, 323-360.

LIU, X.-D., FEDKIW, R., AND KANG, M. 2000. A boundary condition capturing method for poisson's equation on irregular domains. *J. Comp. Phys.* 160, 151-178.

LOSASSO, F., GIBOU, F., AND FEDKIW, R. 2004. Simulating water and smoke with an octree data structure. *ACM Transactions on Graphics* 23, 3, 457-462.

MCNAMARA, A., TREUILLE, A., POPOVI'C, Z., AND STAM, J. 2004. Fluid control using the adjoint method. *ACM Transactions on Graphics* 23, 3, 449-456.

MULLER, M., CHARYPAR, D., AND GROSS, M. 2003. Particlebased fluid simulation for interactive applications. In *Proceedings of ACM SIGGRAPH/Eurographics Symposium on Computer Animation* 2003, 154-159.

MULLER, M., SOLENTHALER, B., KEISER, R., AND GROSS, M. 2005. Particle-based fluid-fluid interaction. In *Proceedings of Eurographics/ACM SIGGRAPH Symposium on Computer Animation* 2005, 237-244.

PARK, S. I., AND KIM, M. J. 2005. Vortex fluid for gaseous phenomena. In *Proceedings of Eurographics/ACM SIGGRAPH Symposium on Computer Animation* 2005, 261-270.

PREMO^Z E, S., TASDIZEN, T., BIGLER, J., LEFOHN, A., AND WHITAKER, R. T. 2003. Particle-based simulation of fluids. In *Eurographics 2003 proceedings*, Blackwell Publishers, 401-410.

RASMUSSEN, N., NGUYEN, D. Q., GEIGER, W., AND FEDKIW, R. 2003. Smoke simulation for large scale phenomena. *ACM Transactions on Graphics* 22, 3, 703-707.

SELLE, A., RASMUSSEN, N., AND FEDKIW, R. 2005. A vortex particle method for smoke, water and explosions. *ACM Transactions on Graphics* 24, 3, 910-914.

SONG, O.-Y., SHIN, H., AND KO, H.-S. 2005. Stable but nondissipative water. *ACM Transactions on Graphics* 24, 1, 81-97.

STAM, J., AND FIUME, E. 1995. Depicting fire and other gaseous phenomena using diffusion processes. *Computer Graphics (Proc. ACM SIGGRAPH '95)* 29, Annual Conference Series, 129-136.

STAM, J. 1999. Stable fluids. *Computer Graphics (Proc. ACM SIGGRAPH '99)* 33, Annual Conference Series, 121-128.

STANIFORTH, A., AND CO T'E, J. 1991. Semi-lagrangian integration scheme for atmospheric model—a review. *Mon. Weather Rev.* 119, 12, 2206-2223.

TREUILLE, A., MCNAMARA, A., POPOVI'C, Z., AND STAM, J. 2003. Keyframe control of smoke simulations. *ACM Transactions on Graphics* 22, 3, 716-723.

WANG, H., MUCHA, P. J., AND TURK, G. 2005. Water drops on surfaces. *ACM Transactions on Graphics* 24, 3, 921-929.

YABE, T., AND AOKI, T. 1991. A universal solver for hyperbolic equations by cubic-polynomial interpolation i. one-dimensional solver. *Comp. Phys. Comm.* 66, 219-232.

YABE, T., AND AOKI, T. 1991. A universal solver for hyperbolic equations by cubic-polynomial interpolation ii. two- and three dimensional solvers. *Comp. Phys. Comm.* 66, 233-242.

YABE, T., XIAO, F., AND UTSUMI, T. 2001. The constrained interpolation profile method for multiphase analysis. *J. Comp. Phys.* 169, 556-593.

ZHU, Y., AND BRIDSON, R. 2005. Animating sand as a fluid. *ACM Transactions on Graphics* 24, 3, 965-972.

What is claimed is:

1. A method for simulating detailed movements of fluids using derivative particles comprising steps of:
   a) modeling fluids with an adaptive grids based on octree data structure;
   b) solving Navier-Stokes equations for incompressible fluids for fluid velocity at grid points;
   c) using a fractional step method in time-integration of the Navier-Stokes equations;
   d) grouping the fractional steps into a non-advection part and an advection part;
   e) selecting a grid advection part or a particle advection part according to the degree of details of the simulation;
   f) using an octree-based CIP method for the grid advection part; and
   g) using a derivative particle model for the particle advection part,
   wherein the step of using a derivative particle model for the particle advection part is used when the degree of details of the simulation is high,
wherein the derivative particle model uses a particle-based Lagrangian scheme, wherein
the level set and its derivative at the grid point is calculated with $$\phi(x) = \phi_p + \frac{\nabla \phi_p}{|\nabla \phi_p|} \cdot (x - x_p)$$

and $$\nabla \phi(x) = \nabla \phi_p,$$

where p is the gradient carried by the derivative particle.

2. The method of claim 1, wherein the adaptive grid increases the number of grids for a region of high interest in detail.

3. The method of claim 1, wherein the octree data structure comprises a tree data structure, wherein each internal node has up to eight children.

4. The method of claim 1, wherein the Navier-Stokes equations for incompressible fluids can be written as $$\frac{\partial u}{\partial t} = -(u \cdot \nabla)u - \frac{\nabla p}{\rho} + \nabla \cdot (\mu \nabla u) + \frac{f}{\rho},$$

$$\nabla \cdot u = 0$$

wherein u is the velocity, p is the pressure, f is the external force, $\mu$ is the viscosity coefficient, and $\rho$ is the fluid density.

5. The method of claim 1, further comprising a step of using a level set method for tracking a surface of the fluids, wherein the level set method comprises a level set field $\phi$.

6. The method of claim 5, wherein the level set field $\phi$ is updated according to $$\frac{\partial \phi}{\partial t} + u \cdot \nabla \phi = 0$$

with signed-distance $|\nabla \phi|=1$.

7. The method of claim 6, wherein the time integration of $$\frac{\partial \phi}{\partial t} + u \cdot \nabla \phi = 0$$

involves only the advection part.

8. The method of claim 6, wherein the grid advection part advects the velocity and level set fields calculated from the non-advection part according to the current velocity field.

9. The method of method 6, wherein the grid advection part advects the velocity and the level set using Eulerian advection steps.

10. The method of claim 9, wherein the Eulerian advection is performed by the octree-based CIP (Contrained Interpolation Profile) method.

11. The method of claim 1, wherein the step of using an octree-based CIP method for the grid advection part comprises a step of advecting the velocity and level set and their derivatives with the octree-based CIP method.

12. The method of claim 11, wherein the equation for advecting derivatives is obtained directly from the equation, $$\frac{\partial \phi}{\partial t} + u \cdot \nabla \phi = 0,$$

where $\phi$ is the physical quantity that is being advected, wherein an advecting equation of a derivative of a spatial variable x is obtained by differentiating the equation with respect to x, as $$\frac{\partial \phi_x}{\partial t} + u \cdot \nabla \phi_x = -u_x \cdot \nabla \phi.$$

13. The method of claim 12, wherein the step of solving the advecting equation of a derivative of x comprises a step of using the fractional step method, wherein the step of using the fractional step method comprises steps of:
   a) solving the non-advection part $\partial \phi_x/\partial t = -u_x \cdot \nabla \phi$ using finite differencing method;

b) advecting the result according to $$\frac{\partial \phi_x}{\partial t} + u \cdot \nabla \phi_x = 0;$$

and c) sampling a pressure value at the center of a cell defined by the grids and sampling the other values including velocity, level set, and their derivatives at the nodes.

14. The method of claim 1, further comprising steps of:
   a) combining the octree-based CIP method with the adaptive grids; and
   b) minimizing octree artifact caused by the regional variation in the grid resolution of the octree data structure by simulating the advection with the octree-based CIP method.

15. The method of claim 1, further comprising steps of:
   a) converting the velocity and level set defined on the grids to the velocity and level set defined on the particles before the step of using a derivative particle model for the particle advection part (Grid-to-Particle); and
   b) converting the velocity and level set defined on the particles to the velocity and level set defined on the grids (Particle-to-Grid) before going back to the step of using an octree-based CIP model for the grid advection part.

16. The method of claim 1, wherein the step of using a derivative particle model for the particle advection part comprises steps of:
   a) adjusting particles' level set value; and
   b) performing a particle-reseeding.

17. The method for simulating detailed movements of fluids using derivative particles comprising steps of:
   a) modeling fluids with an adaptive grids based on octree data structure;
   solving Navier-Stokes equations for incompressible fluids for fluid velocity at grid points;
   c) using a fractional step method in time-integration of the Navier-Stokes equations;
   d) grouping the fractional steps into a non-advection part and an advection part;
   e) selecting a grid advection part or a particle advection part according to the degree of details or the simulation;
   f) using an octree-based CIP method for the grid advection part; and
   g) using a derivative particle model for the particle advection part,
   wherein the step of using a derivative particle model for the particle advection part is used when the degree of details of the simulation is high,
   further comprising steps of:
      converting the velocity and level set defined on the grids to the velocity and level set defined on the particles before the step of using a derivative particle model for the particle advection part (Grid-to-Particle); and
      converting the velocity and level set defined on the particles to the velocity and level set defined on the grids (Particle-to-Grid) before going back to the step of using an octree-based CIP model for the grid advection part,
   wherein the step of converting the velocity and level set Grid-to-Particle comprises a step of using FLIP approach with a monotonic CIP interpolation instead of the linear interpolation for the conversion of velocity $u^P$, wherein $$u^P = u_-^P + \sum_{i=1}^{4} w_i \Delta u_i^G,$$

where $u_-^P$ is the particle velocity just before the commencement of the non-advection part and $\Delta u_i^G$ is the velocity change at $G_i$ due to the non-advection part.

18. A method for simulating detailed movements of fluids using derivative particles comprising steps of:
   a) modeling fluids with an adaptive grids based on octree data structure;
   b) solving Navier-Stokes equations for incompressible fluids for fluid velocity at grid points;
   c) using a fractional step method in time-integration of the Navier-Stokes equations;
   d) grouping the fractional steps into a non-advection part and an advection part;
   e) selecting a grid advection part or a particle advection part according to the degree of details of the simulation;
   f) using an octree-based CIP method for the grid advection part; and
   g) using a derivative particle model for the particle advection part,
   wherein the step of using a derivative particle model for the particle advection part is used when the degree of details of the simulation is high, further comprising steps of:
      converting the velocity and level set defined on the grids to the velocity and level set defined on the particles before the step of using a derivative particle model for the particle advection part (Grid-to-Particle); and
      converting the velocity and level set defined on the particles to the velocity and level set defined on the grids (Particle-to-Grid) before going back to the step of using an octree-based CIP model for the grid advection part,
   wherein in terms of the velocity $u^P$,
   a grid point G, the nearest particle $P_1$, $P_2$, $P_3$, and $P_4$ selected from each quadrant of G, the velocity of $P_i$, and the derivatives of the x- and y-components of $u_i^P$, $(u_{ix}^P, u_{iy}^P)$ and $(v_{ix}^P, v_{iy}^P)$
   the step of converting the velocity and level set Particle-to-Grid comprises steps of:
   a) coordinate-transforming the derivative $(u_{1x}^P, u_{1y}^P)$ of $u_1^P$ into $(u_{1\|}, u_{1\perp})$, so that $u_{1\|}$ represents the component along the direction $\overline{P_1 P_2}$ and $u_{1\perp}$ represents the component perpendicular to $\overline{P_1 P_2}$, wherein the coordinate-transformed derivative $(u_{2\|}, u_{2\perp})$ of $u_2^P$ is obtained similarly;
   b) performing, on the results obtained in the step (a), one-dimensional monotonic CIP interpolation along the direction $\overline{P_1 P_2}$ in order to calculate $u_A$ and its $\overline{P_1 P_2}$-directional derivative $(u_{A\|}, u_{A\perp})$ at the location A, an intersection point between the grid line and the line segment connecting $P_1$ and $P_2$;
   c) obtaining $(u_{Ax}, u_{Ay})$ from $(u_{A\|}, u_{A\perp})$ by applying the inverse of the above coordinate-transformation;
   d) performing steps (a)~(c) for the particles $P_3$ and $P_4$ to calculate $u_B$ and $(u_{Bx}, u_{By})$ of B, an intersection point between the grid line and the line segment connecting $P_3$ and $P_4$; and
   e) performing, on the results obtained in steps (c) and (d), y-directional monotonic CIP interpolation, which gives the velocity and derivative at G.

* * * * *